United States Patent
Kenig

(10) Patent No.: US 6,878,767 B2
(45) Date of Patent: Apr. 12, 2005

(54) HIGH BARRIER PAINTS

(75) Inventor: Shmuel Kenig, Haifa (IL)

(73) Assignee: Shenkar College of Textile Technology & Fashion, Ramat Gan (IL)

( * ) Notice: Subject to any disclaimer, the term of this patent is extended or adjusted under 35 U.S.C. 154(b) by 190 days.

(21) Appl. No.: 09/983,777

(22) Filed: Oct. 25, 2001

(65) Prior Publication Data

US 2002/0173559 A1 Nov. 21, 2002

(30) Foreign Application Priority Data

May 21, 2001 (IL) .................................................. 143274

(51) Int. Cl.$^7$ ............................ C08J 3/00; C08K 3/20; C08K 9/12; C08K 3/34; B05D 3/02
(52) U.S. Cl. ................ 524/444; 427/372.2; 427/385.5; 523/200; 523/210; 524/445
(58) Field of Search ................................ 524/444, 445, 524/590; 523/200, 210; 427/372.2, 385.5

(56) References Cited

U.S. PATENT DOCUMENTS 5,520,998 A * 5/1996 Uemoto et al.
5,910,523 A * 6/1999 Hudson
6,203,901 B1 * 3/2001 Kosinski et al.

* cited by examiner

Primary Examiner—Patrick D. Niland
(74) Attorney, Agent, or Firm—Pearl Cohen Zedek Latzer, LLP

(57) ABSTRACT

A paint which contains a multitude of extremely thin platelets having a large area/thickness ratio, which serve to greatly reduce permeability of the paint when applied and dried.

Figure 1:
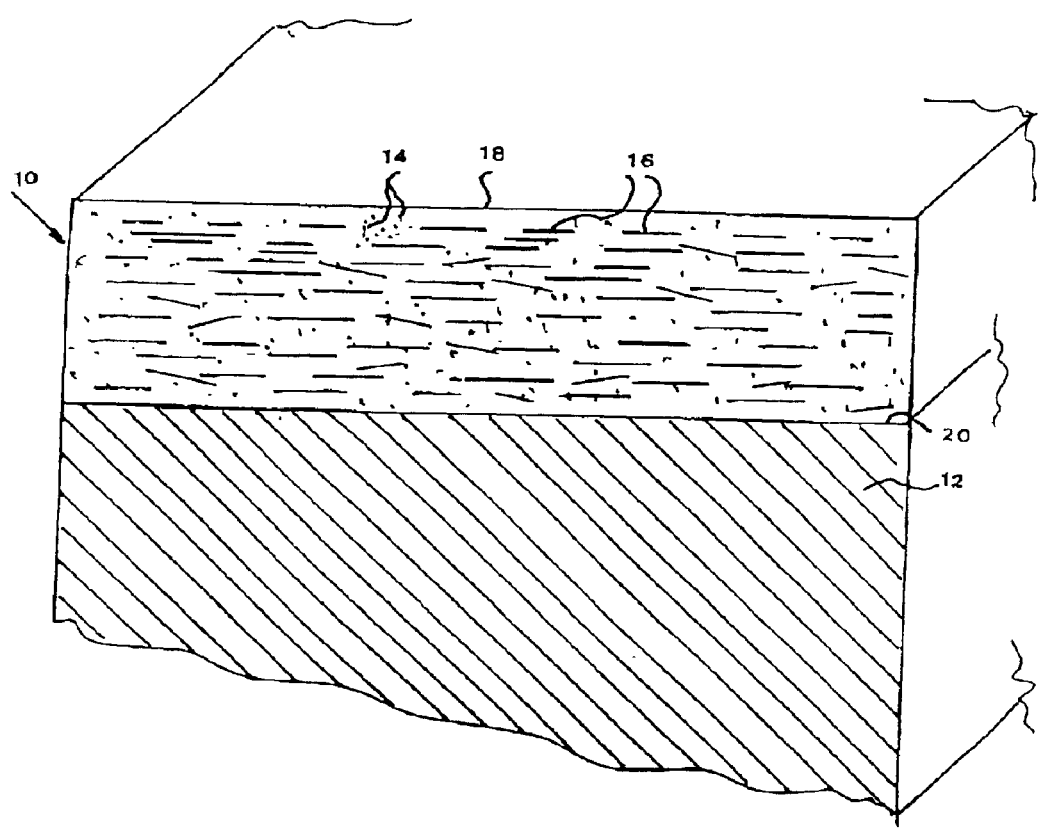

The formulation comprising at least a filmogen, a pigment, and a multitude of chemically-treated platelets about one nanometer thick. The platelets being dispersed in the formulation so that after application and solidification of a coating of the paint the platelets form a barrier substantially impermeable to both liquids and gases.

12 Claims, 1 Drawing Sheet

HIGH BARRIER PAINTS

RELATED APPLICATIONS

This application is based on and claims priority from Israel Application No 143274, filed May 21, 2001, which is incorporated herein by reference.

FIELD AND BACKGROUND OF INVENTION

The present invention relates to corrosion protection by paint. More particularly, the invention provides a paint containing a multitude of extremely thin platelets having a large area/thickness ratio, which serve to greatly reduce permeability of said paint when applied and dried.

Paints are decorative and protective coatings made of finely ground solids, including binders, pigments and other additives such as dryers, plasticizers, emulsifiers, antifoamers, leveling agents and thickeners suspended in a liquid carrier known as a filmogen. The liquid component may be a resin dissolved in a volatile thinner or organic solvents such as drying vegetable oils or solvents respectively, or the carrier may be an aqueous solution. Oil based paints have had difficulties in meeting certain new clean-air laws which mandate that the amount of volatile organic compounds in paint be lowered. Consequently, manufacturers have concentrated much effort on effecting improvements in water-based formulations.

Besides standard paints, special paints are available for particular requirements, for example marine use, chemical resistance, low-odor paints, fire retardation, traffic, and heat reflection.

Although paint has many uses, the application of prime economic importance is the protection of steel surfaces against corrosion, which causes billions of dollars damage yearly.

While other processes such as hot-dip galvanizing provide better protection for steel, paint has many advantages, one of which is that it can be applied in many situations, capital investment required is negligible, the item to be protected may be large or small, fixed or mobile, and paint can be applied to structures where processes such as hot dipping cannot be used.

It is general considered to be good practice that in order to obtain strong adhesion of a paint to a substrate, the latter is modified before painting either by mechanical means such as roughening, or by chemical means such as the application primers or etching, the aim being the development of a durable interface between the paint and the article being coated.

The process of corrosion of painted metals is initiated by permeation of humidity, corrosive salts and/or solvents into the paint layer, causing softening and degradation of the paint. Subsequently the attacking substance reaches the paint/metal interface, which fails thereafter. This allows the invading substance to attack the metal itself. Clearly it would be advantageous if possible to halt such penetration in the outer or middle portion of the paint layer before the paint/metal interface is endangered.

Nanoplatelets have been used in the plastics industry for purposes of mechanical reinforcement, fire retardancy and in reducing permeability. Alumina-silicate nanoplatelets are presently available commercially, at the moderate cost of about $5/kg. Published prior art includes use of platelets in pigments but for purposes other than that proposed in the present invention.

Andes in U.S. Pat. Nos. 5,858,078 and 5,985,020 discloses a titanium dioxide pigment based on platelets made thereof. Schmid, in U.S. Pat. Nos. 6,139,614 and 6,193,794 has recently proposed the use of coated iron oxide or silicatic platelets for producing goniochromatic luster pigments. Such applications are intended to produce special optical effects but are not intended to reduce the permeability of a paint coating.

OBJECTS OF THE INVENTION

Bearing in mind this state of the art, It is one of the objects of the present invention to obviate the limitations of prior art paints and to provide a paint formulation which will provide a substantially impermeable coating when applied to a substrate and dried either naturally or by accelerating means.

DISCLOSURE AND PREFERRED EMBODIMENT

The present invention achieves the above object by providing a low-permeable paint formulation comprising at least a filmogen, a pigment, and a multitude of chemically-treated platelets about one nanometer thick, said platelets being dispersed in said formulation so that after application and solidification of a coating of said paint said platelets form a barrier substantially impermeable to both liquids and gases.

In a preferred embodiment of the present invention there is provided a paint formulation wherein said platelets have width and breadth dimensions of approximately one half to one micrometer.

In a most preferred embodiment of the present invention there is provided paint formulation wherein said chemical treatment of said platelets comprises treatment with polar compounds, such as amino terminated silanes, epoxy tested silanes, epoxy based compounds acrylics, and combinations thereof.

Yet further embodiments of the invention will be described hereinafter.

It will thus be realized that the novel formulation of the present invention serves to stop the migration of liquids and gases towards the substrate due to the very long and very narrow paths which exist between the platelets. Said paths are filled with the solidifying components of the paint formulation, and are therefor not free paths. The platelets themselves are impermeable due to being made of a ceramic material such as an alumino-silicate. Thus the paint of the present invention achieves its object of halting the ingress of both gases and liquids before these reach the paint/substrate interface, and thereby prevent paint peeling and corrosive attack, to extend the durability of the item being protected. The new paint is expected to be useful even for the protection of steel structures in marine environments.

SHORT DESCRIPTION OF DRAWINGS

The invention will now be described further with reference to the accompanying drawing, which represents by example a preferred embodiment of the invention. The described example, together with the drawing, will make apparent to those skilled in the art how further forms of the invention may be realized.

In the drawing:

FIG. 1 is a diagrammatic view of a paint coat after drying, the coating thickness being greatly expanded for illustrative purposes, the coating resulting from use of the paint formulation according to the invention.

DETAILED DESCRIPTION

There is seen in FIG. 1 a diagrammatic representation of a dried paint coating 10 applied to a substrate 12, for example the surface of a steel structure. The dried coating 10 was formed by the application of a low-permeable paint formulation comprising a filmogen and a pigment 14, and additional ingredients which may be desirable such as a drier, a plasticizer, an emulsifier, an anti-foam agent, a leveling agent and a thickener. This basic paint formulation is covered by prior art.

A multitude of chemically-treated platelets 16 about one nanometer thick are dispersed in the paint formulation. The platelets 16 occupy a volume of 1% to 10% of the liquid formulation. After application to the substrate 12 and solidification of the coating the platelets 16 form a barrier substantially impermeable to both liquids and gases. The platelets 16 are preferably made of an alumino-silicate, and have width and breadth dimensions of approximately one micrometer.

A typical paint coating, after drying, is about 0.1 mm thick. This is about 100 times larger than the length/breadth of the platelets 16, which could theoretically orient themselves in any direction. Given random orientation, about 20% of the platelets will be parallel to the outer surface or nearly parallel thereto. Due to the vast numbers of platelets contained in a coating, this alone would provide a coating with greatly improved penetration resistance.

In the present invention the platelets 16 are chemically treated with the object of employing inter-molecular forces to bring the vast majority of the platelets into reasonably parallel relationship with the outer surface of the coating 18 while the coating is still fluid, and particularly with brush application preferably immediately on contact of the formulation with the substrate. Thus the present invention also provides a process for the application of the low-permeable paint formulation, wherein the platelets are oriented during application primarily in a direction parallel to the surface 20 of the substrate 12 being coated.

Suitable chemical treatments of platelets comprises treatment with polar compounds such as amino terminated silanes, epoxy terminated silanes, epoxy based compounds acrylics, and combinations thereof.

A suitable non-polar compound is an aliphatic acid.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

What is claimed is:

1. An anti-corrosive paint comprising a multitude of chemically-treated platelets about one nanometer thick, wherein the chemical treatment is performed with epoxy terminated silanes, epoxy based compounds acrylics, and combination thereof, said platelets being dispersed in said formulation so that after application and solidification of a coating of said paint, said platelets form a barrier which reduce permeability to both liquids and gases.

2. The anti-corrosive paint formulation as claimed in claim 1, wherein said platelets have width and breadth dimensions of approximately one half to one micrometer.

3. The anti-corrosive paint formulation as claimed in claim 1, wherein said platelets comprise a alumino-silicate.

4. The anti-corrosive paint formulation as claimed in claim 1, wherein said platelets occupy a volume of 1% to 10% of said liquid formulation.

5. A low permeable paint formulation comprising the anti-corrosive paint of claim 1 and at least a filmogen, and a pigment.

6. The paint formulation as claimed in claim 5, wherein the platelets included in the anti-corrosive paint have width and breadth dimensions of approximately one half to one micrometer.

7. The paint formulation as claimed in claim 6, wherein said platelets comprise a alumino-silicate.

8. The paint formulation as claimed in claim 6, wherein said platelets occupy a volume of 1% to 10% of said liquid formulation.

9. A method for preventing corrosion of steel comprising the step of coating the steel with the anti-corrosive paint of claim 1 and allowing the coating to dry.

10. A method according to claim 9, wherein the platelets of said paint are oriented during coating primarily in a direction parallel to the surface of the object being coated.

11. A method for preventing corrosion of steel comprising the steps of coating the steel with the low-permeable paint form and allowing the coating to dry.

12. A method according to claim 11 the platelets of said paint are oriented during coating primarily in a direction parallel to the surface of the object being coated.

* * * * *